(12) United States Patent
Brachert et al.

(10) Patent No.: US 7,318,427 B2
(45) Date of Patent: Jan. 15, 2008

(54) METHOD FOR OPERATING AN INTERNAL COMBUSTION ENGINE

(75) Inventors: Götz Brachert, Stuttgart (DE); Rüdiger Herweg, Esslingen (DE); Kai Kanning, Stuttgart (DE); Matthias Pfau, Ludwigsburg (DE); Jochen Schaflein, Stuttgart (DE); Hans-Jürgen Weiman, Oppenweiler (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/403,563

(22) Filed: Apr. 13, 2006

(65) Prior Publication Data

US 2006/0201489 A1 Sep. 14, 2006

Related U.S. Application Data

(63) Continuation-in-part of application No. PCT/EP2004/010446, filed on Sep. 17, 2004.

(30) Foreign Application Priority Data

Oct. 16, 2003 (DE) .................................. 103 48 138

(51) Int. Cl.
 *F02L 1/34* (2006.01)
 *F02M 25/07* (2006.01)
 *F02B 47/08* (2006.01)
(52) U.S. Cl. ............................... 123/568.14; 123/90.15
(58) Field of Classification Search ............... 123/295, 123/305, 90.11, 90.15, 90.16, 90.17, 316, 123/345–348, 568.14
See application file for complete search history.

(56) References Cited

U.S. PATENT DOCUMENTS

| 6,245,367 | B1 | 6/2001 | Galomb | |
|---|---|---|---|---|
| 6,336,436 | B1 | 1/2002 | Miyakubo et al. | |
| 6,386,177 | B2 * | 5/2002 | Urushihara et al. | 123/299 |
| 6,622,689 | B2 * | 9/2003 | Hasegawa et al. | 123/294 |
| 6,640,771 | B2 * | 11/2003 | Fuerhapter | 123/295 |
| 6,739,295 | B1 * | 5/2004 | Yamaoka et al. | 123/90.15 |
| 7,017,561 | B1 * | 3/2006 | Liu et al. | 123/568.12 |
| 7,021,277 | B2 * | 4/2006 | Kuo et al. | 123/299 |
| 7,089,912 | B2 * | 8/2006 | Koopmans | 123/406.45 |
| 7,171,957 | B2 * | 2/2007 | Liu et al. | 123/568.12 |

(Continued)

FOREIGN PATENT DOCUMENTS

DE 198 10 935 9/1999

(Continued)

*Primary Examiner*—Hai Huynh
(74) *Attorney, Agent, or Firm*—Klaus J. Bach

(57) ABSTRACT

In a method of operating a reciprocating-piston internal combustion engine with a combustion chamber in which a fuel mix with fresh gas is provided via intake ports and combustion exhaust gases are discharged through exhaust ports which can be opened by intake valves and, respectively, exhaust valves which are actuated by a valve operating mechanism, wherein an operating mode with external ignition, in which the fuel mix is ignited by a spark plug, is provided in part of the load range of the internal combustion engine, and an operating mode with compression ignition, in which the control of the gas exchange valves is altered so as to retain combustion exhaust gases in the combustion chamber for participation in the formation of the fresh mix is provided in another load range of the internal combustion engine, during a change in the operating mode the valve lift of at least one of the gas exchange valves is altered.

11 Claims, 3 Drawing Sheets

U.S. PATENT DOCUMENTS

| | | |
|---|---|---|
| 7,194,996 B2 * | 3/2007 | Koopmans .................. 123/295 |
| 7,213,566 B1 * | 5/2007 | Jankovic et al. ............ 123/302 |
| 2001/0015192 A1 | 8/2001 | Urushihara et al. |
| 2002/0011233 A1 | 1/2002 | Shirashi et al. |
| 2003/0056736 A1 * | 3/2003 | Unger et al. .............. 123/27 R |
| 2005/0183693 A1 * | 8/2005 | Yang et al. ................. 123/305 |
| 2006/0196466 A1 * | 9/2006 | Kuo et al. .................. 123/295 |
| 2006/0219212 A1 * | 10/2006 | Brachert et al. ............ 123/295 |
| 2007/0144480 A1 * | 6/2007 | Herweg et al. ............. 123/295 |

FOREIGN PATENT DOCUMENTS

| | | |
|---|---|---|
| DE | 198 18 596 | 11/1999 |
| DE | 198 52 552 | 10/2000 |
| DE | 199 23 413 | 11/2000 |
| WO | WO 99/42718 | 8/1999 |

* cited by examiner

METHOD FOR OPERATING AN INTERNAL COMBUSTION ENGINE

This is a Continuation-In-Part Application of international application PCT/EP2004/010446 filed Sep. 17, 2004 and claiming the priority of German Application 103 48 138.9 filed Oct. 16, 2003.

BACKGROUND OF THE INVENTION

The invention relates to a method for operating an internal combustion engine including cylinders with pistons delimiting combustion chambers to which fuel and fresh gas are supplied and from which combustion gases are discharged via controllable inlet and outlet valves.

In a reciprocating-piston internal combustion engine, a combustion chamber, in which fuel is burnt, is delimited by a longitudinally movable piston in each cylinder. Oxygen-containing fresh gas for the combustion of fuel is supplied via intake ports of the cylinders, while the combustion exhaust gases are discharged via exhaust ports. The ports are controlled by intake valves and exhaust valves which are actuated by a valve operating mechanism to carry out the cyclic charge exchange.

In a spark ignition engine, the fuel mix which is formed in the combustion chamber is ignited by the ignition spark of a cylinder spark plug projecting into the combustion chamber. An internal combustion engine operating mode known as compression ignition or chamber ignition is also known for initiating the combustion of the fuel. This operating mode offers the possibility of fuel combustion for driving the internal combustion engine with a good efficiency and a low tendency to form nitrogen-containing gases. DE 198 52 552 C2 discloses a method for operating a four-stroke internal combustion engine, in which combustion exhaust gases are retained in the combustion chamber and, as a result of the increase in temperature of the fuel/air mix, during the compression stroke of the next working cycle of the respective cylinder, a temperature of the compressed volume at which the mix is ignited is reached. Combustion exhaust gases can be retained in the cylinder by means of a valve closure overlap of the control times of the gas exchange valves. The known method seeks to control the valve closure overlap as a function of engine speed and load by means of an exhaust-gas throttle valve which is equally effective for all the cylinders of the engine.

It is also known that compression ignition, that is a fuel combustion method with spontaneous ignition of homogenous fuel/air mix, is carried out only in certain part-load ranges of the internal combustion engine because of certain limitations for this operating mode. DE 199 23 413 A1 describes a method in which the compression ignition is carried out under steady state engine operating conditions in a narrow part-load range of the engine performance map, whereas spark ignition initiated combustion is provided for higher engine loads. To change the operating mode, the known method provides for a change between valve closure overlap and valve opening overlap of the gas exchange valve control times by means of displacement of a camshaft. The camshaft actuating the valve operating mechanism for the gas exchange valves, is switchable, by means of a switching means changing the cam shape for valve opening overlap (spark ignition cycle operation) and a cam shape for exhaust gas retention in the compression ignition mode.

U.S. Pat. No. 6,336,436 B1 discloses a method for changing the operating mode of an internal combustion engine between external ignition and compression ignition, wherein the retention of exhaust gas during the compression ignition mode is realized by changing the control times of the gas exchange valves over the course of internal exhaust-gas recirculation. In this case, in the compression ignition mode, the closure time of the exhaust valve is shifted in the "late" direction compared to the external ignition mode. At the same time, the opening time of the intake valve is advanced, resulting in an opening overlap of the valve control times. The change in the control times of the gas exchange valves with a change in the operating mode is alternatively achieved in the known arrangement by a variably settable mechanism or by a camshaft having a plurality of cam profiles for the forced control of the respective valves. The known method provides for a changeover between the operating modes with a defined transition operating procedure, in which stratified mix formation is provided for by direct injection of fuel during the compression stroke. In the known method, a stable change between the combustion methods is provided for by the transition mode extending over a plurality of working cycles during a change between compression ignition and external ignition. This requires a long transition between the operating mode, since otherwise knocking and severe running irregularities in the internal combustion engine may ensue.

It is the object of the present invention to provide a method for operating an internal combustion engine which changes between an external ignition operating mode and a compression ignition operating mode wherein deteriorations in the overall efficiency of the internal combustion engine, in particular during a change in the operating modes, are avoided by structurally simple means.

SUMMARY OF THE INVENTION

In a method of operating a reciprocating-piston internal combustion engine with a combustion chamber to which a fuel mix with fresh gas is supplied via intake ports and combustion exhaust gases are discharged through exhaust ports which can be opened by intake valves and, respectively, exhaust valves which are actuated by a valve operating mechanism, wherein an operating mode with external ignition in which the fuel mix is ignited by a spark plug, is provided in part of the load range of the internal combustion engine and an operating mode with compression ignition, in which the control of the gas exchange valves is altered so as to retain combustion exhaust gases in the combustion chamber for participation in the formation of the fuel mix is provided in another load range of the internal combustion engine, the valve lift of at least one of the gas exchange valves is altered during a change in the operating mode.

If the gas exchange valves are controlled by a cam valve mechanism, different cam contours are provided for the external ignition mode and the compression ignition mode. Different cam contours can be used as alternatives by means of a switching element of the valve operating mechanism, which is activated during a change between operating modes with different valve lifts. The switching element may expediently be a switchable cup tappet of the gas exchange valve. Switchable cam followers can also advantageously be used as the switching element. It has also been found to be advantageous if the start of combustion in the compression ignition mode is controlled by phase angle adjusters on the camshafts in addition to a valve lift adjustment by the switching elements.

In an advantageous configuration of the invention, during a change in the operating mode following the change in the opening lift of one valve type, the phase position of the opening operation of the other valve type is altered. If the change in the operating mode is controlled by switching only the valve lift of the exhaust valve, with a change to the external ignition mode, the phase position of the opening operation of the intake valve should be advanced, in order to improve the efficiency in the spark ignition cycle. Accordingly, in the event of a change in the operating mode from the external ignition mode to the compression ignition mode, the phase position of the intake valve should be shifted in the "late" direction because of an intermediate compression. It is expedient that the switch to the external ignition mode is accompanied by an adjustment to the setting of a throttle member in the intake duct in order to ensure stoichiometric mix formation in the external ignition mode.

For switching from the external ignition mode to the compression ignition mode, it is advantageous if the valve lift of the intake valve alone is reduced, with the phase position of the opening operation of the exhaust valve being adjusted in the "late" direction. As a result during the downward movement of the piston exhaust gas is sucked back into the cylinder out of the exhaust port. The shift in the phase position of the exhaust valve is reversed again during a change to the external ignition mode by means of a corresponding advance, in which case the pressure difference which occurs in the intake port can be considered, that is, maintained by suitable correction of the throttle valve position.

In a further advantageous configuration of the invention, in the event of a change in operating modes, the opening lift of both valve types is altered simultaneously, resulting in an immediate transition from one combustion method to the other. To ensure stoichiometric mix formation in the external ignition mode, the position of the throttle member during the change in operating modes has to be altered very extensively, but a further valve lift switching in the external ignition mode is not required.

The change in the valve lift in accordance with the invention leads to a sudden change in the composition of the combustion chamber mix both with an action on just one valve and with an alteration to the opening lift of both exchange valve types. In this way, depending on the valve lift, given the presence of suitable quantities of exhaust gas, the compression ignition mode is established or alternatively deactivated.

Exemplary embodiments of the invention are will be described below in greater detail with reference to the accompanying drawings:

DESCRIPTION OF A PARTICULAR EMBODIMENT

Figure 1:
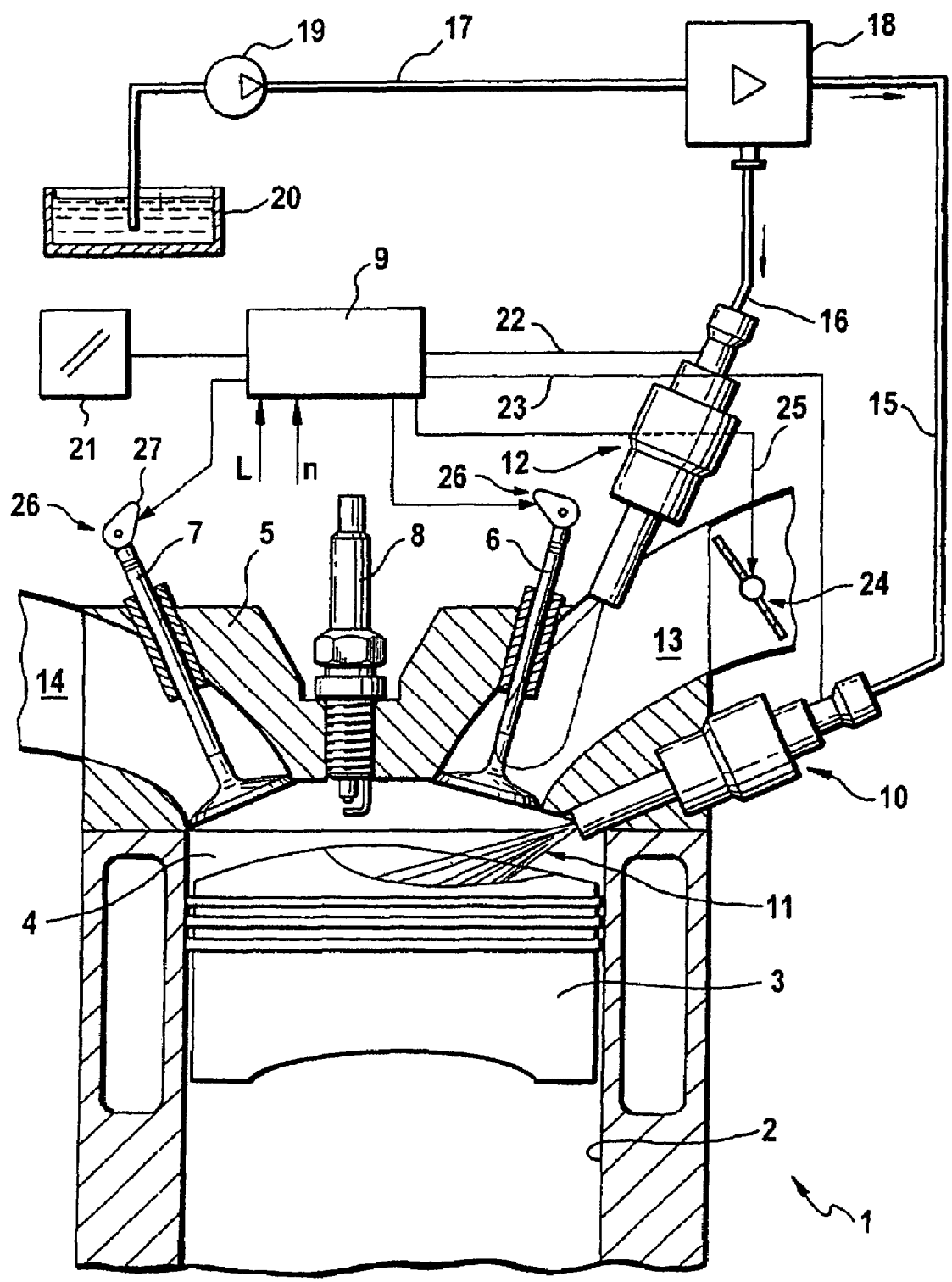
FIG. 1 is a longitudinal sectional view of a cylinder of a reciprocating-piston internal combustion engine.

FIG. 1 shows a reciprocating-piston internal combustion engine 1, in each of whose cylinders 2 there is arranged a longitudinally movable reciprocating piston 3 which delimits a combustion chamber 4 that is closed off by a cylinder head 5 attached to the cylinder 2. A mix of fuel and combustion air is formed in the combustion chamber 4 and burnt in order to drive the reciprocating piston 3. At least one intake port 13 and an exhaust port 14 are formed in the cylinder head 5. Oxygen-rich fresh gas is supplied through the intake port 13, and the combustion exhaust gases are discharged from the combustion chamber through the exhaust port 14. Gas exchange valves 6, 7, which are driven by a valve operating mechanism 26 and, depending on the nature of the four-stroke method, cyclically open the intake port 13 and with regard to the exhaust valve 7 open the exhaust port 14, are provided for the purpose of controlling the charge exchange. To meter in the fuel required for combustion, each cylinder is provided with an injector 10, which is in each case arranged in the cylinder head 5 and directs a fuel jet 11 directly into the combustion chamber 4. As an alternative or in addition, an induction pipe injector 12, which releases fuel into the intake port 13, is provided. Fuel is supplied to the direct injector 10 and the induction pipe injector 12 via fuel lines 15, 16 of one or more fuel pumps 18 to which fuel is supplied from a fuel tank 20 via a supply line 17.

In the present exemplary embodiment, the fuel pump is a high-pressure pump and provides fuel at a high injection pressure to the direct fuel injection valve 10. In the exemplary embodiment shown here, a supply pump 19 is arranged in the supply line 17. The metering of fuel is accomplished by a control unit 9 as a function of the operating point of the internal combustion engine. To transmit injection commands, the control unit 9 is connected to the induction pipe injector 12 via a signal line 22 and to the direct injection valve 10 via a signal line 23. The control unit 9 determines the momentary operating point of the internal combustion engine as a function of operating parameters which are measured on an ongoing basis. In the present exemplary embodiment the load L and speed n of the internal combustion engine 1 are measured and stored control values are taken from an engine performance graph memory 21 in order to determine the engine operating point and select the associated control commands. The control unit 9 also sets the position of a throttle valve 24 arranged in the intake port 13. The mix in the combustion chamber 4 is configured by the setting of the throttle valve 24 and the associated effects on the fresh gas stream and the pressure in the intake port 13 as well as the injection parameters used to meter in the fuel. Depending on the operating point of the engine, it is possible to form a lean mix with, for example, stratified mix formation by direct fuel injection during the compression stroke of the piston 3 or to form a homogenous mix with a stoichiometric mix composition.

In higher load ranges, the internal combustion engine is operated with external ignition in the manner of a spark-ignition (Otto) engine, in which case the mix formed in the combustion chamber 4 is ignited by the ignition spark of a spark plug 8 arranged in the cylinder head 5. Operation with compression ignition is provided for in lower to medium load ranges. In this operating mode, which is also referred to as chamber combustion method, combustion exhaust gas can be retained in the combustion chamber 4 for admixing with the fresh gas of the next working cycle to a sufficient extent, by means of a suitable control of the gas exchange valves 6, 7, providing for a rise of the combustion chamber temperature so that spontaneous ignition of the charge, which has been heated by the compression by the piston 3, can take place. To switch between the external ignition mode and the compression ignition mode, the control unit 9 acts on the controllable valve operating mechanism 26 of the gas exchange valves 6, 7 in an appropriate way. The valve operating mechanism 26 provided may be a variably controllable valve operating mechanism, for example an electromechanical or electro-hydraulic valve control, by means of which the control times, i.e. opening and closure times, and therefore the opening duration of the gas exchange valves, can be adjusted as required. In the present exemplary embodiment, the valve operating mechanism 26 provided is a cam control mechanism, in which the cam contours of control cams 27 driven by a camshaft cyclically lift the gas exchange valves off their valve seats. To switch the valve control to change the operating modes between external ignition mode and compression ignition mode, the cam valve mechanism 26 is provided with switching means, which are described in more detail below.

According to the invention, a change in the composition of the working gas in the combustion chamber 4 in the event of a change of the operating mode can be achieved by a change in the valve lift of at least one of the gas exchange valves 6, 7. In the present exemplary embodiment, the gas exchange valves 6, 7 are controlled by a cam valve operating mechanism 26, wherein different cam contours 27 are provided for the external ignition mode and the compression ignition mode. The valve mechanism 26 comprises a switching element which uses the cam contours 27 as alternatives for the respective operating modes. The switching element may be a switchable cup tappet or a switching cam follower.

The change between the external ignition operating mode and the compression ignition operating mode takes place by switching the valve lift in accordance with the invention. With the switching of the valve lift, it is possible to provide the required high proportion of hot exhaust gas for triggering spontaneous ignition during the compression ignition operating modes and to prevent knocking in the Ottocycle external ignition operating mode.

Figure 2:
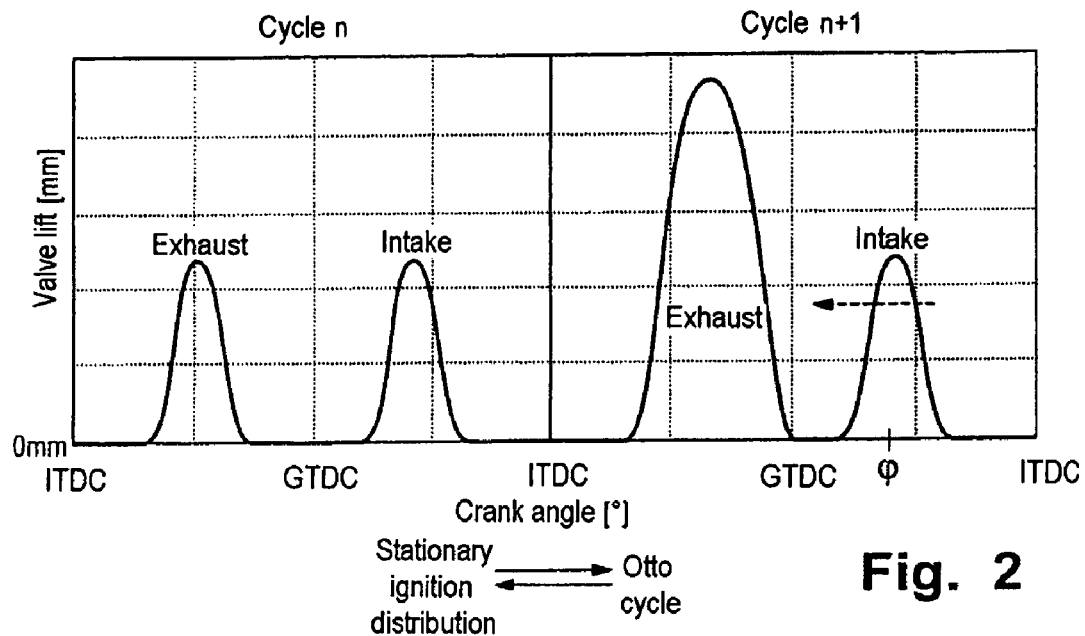
FIG. 2 is a graph illustrating the valve lift curves for the event of the exhaust valve being adjusted during a change of the operating mode.

FIG. 2 shows the profile of the valve lift curves for a first possible option for changing the operating mode, in which only the valve lift of the exhaust valve is altered. In the event of switching to the external ignition mode (Otto cycle), the valve lift of the exhaust valve is increased. To ensure operation in the external ignition mode which is favorable in terms of efficiency, simultaneously with or advantageously after the increase in the opening lift of the exhaust valve, the phase position φ of the opening operation of the intake valve is advanced. In the event of a change from external ignition mode to the compression ignition mode (stationary injection distribution), accordingly the opening lift of the exhaust valve is reduced again and the phase position φ of the intake stroke is adjusted in the "late" direction, in order thereby to counteract the effects of the intermediate compression which occurs during the change in operating mode. In both directions of the change in operating mode between external ignition mode and compression ignition mode, the control unit influences the mix formation by varying the setting angle of the throttle valve, in order to ensure stoichiometric mix ratios in the external ignition mode and a throttled compression ignition mode.

Figure 3:
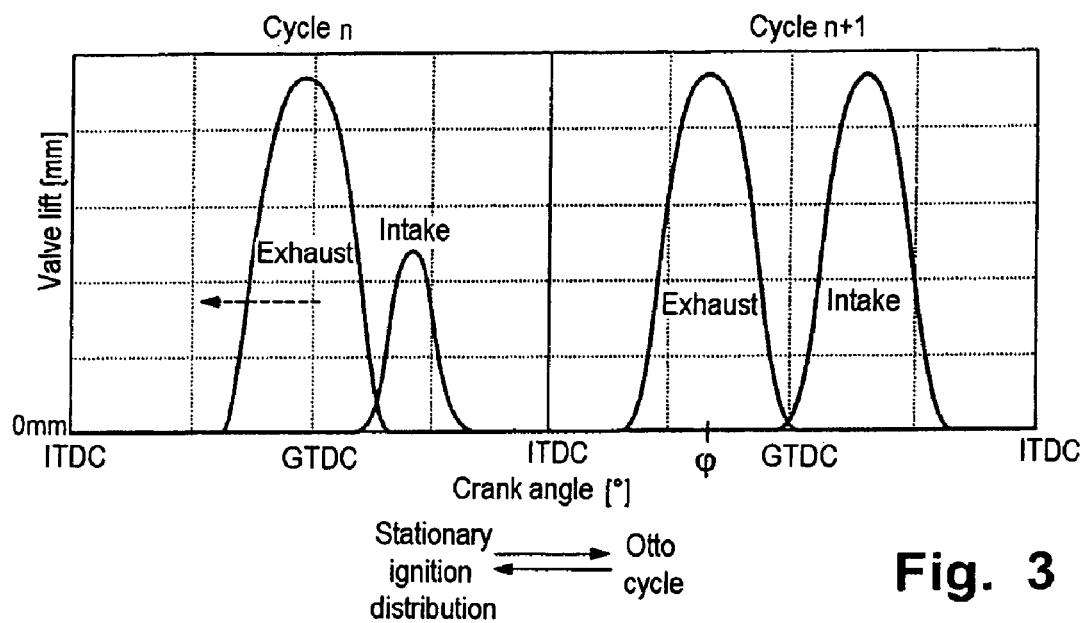
FIG. 3 shows a graph illustrating the valve curves for the event of a switchover of the intake valve during a change of the operating mode.

FIG. 3 shows the valve lift curves for the exhaust valve and the intake valve for the event that the operating mode is switched by altering the valve lift of the intake valve. In this operating mode, the opening lift of the intake valve is reduced during the switching from the external ignition mode to the stationary ignition distribution mode. This configuration of the method according to the invention is particularly advantageous in order to suck exhaust gases back out of the exhaust port. In this case, the phase position of the opening operation of the exhaust valve in the compression ignition mode can be moved a very long way toward the phase position of the intake valve, with the result that the piston, during its downward suction movement, sucks previously discharged exhaust gas back out of the exhaust port into the combustion chamber. During a change from the compression ignition mode (stationary ignition distribution) to the external ignition mode, the phase position φ of the exhaust valve is advanced again in the direction indicated by the arrow.

Figure 4:
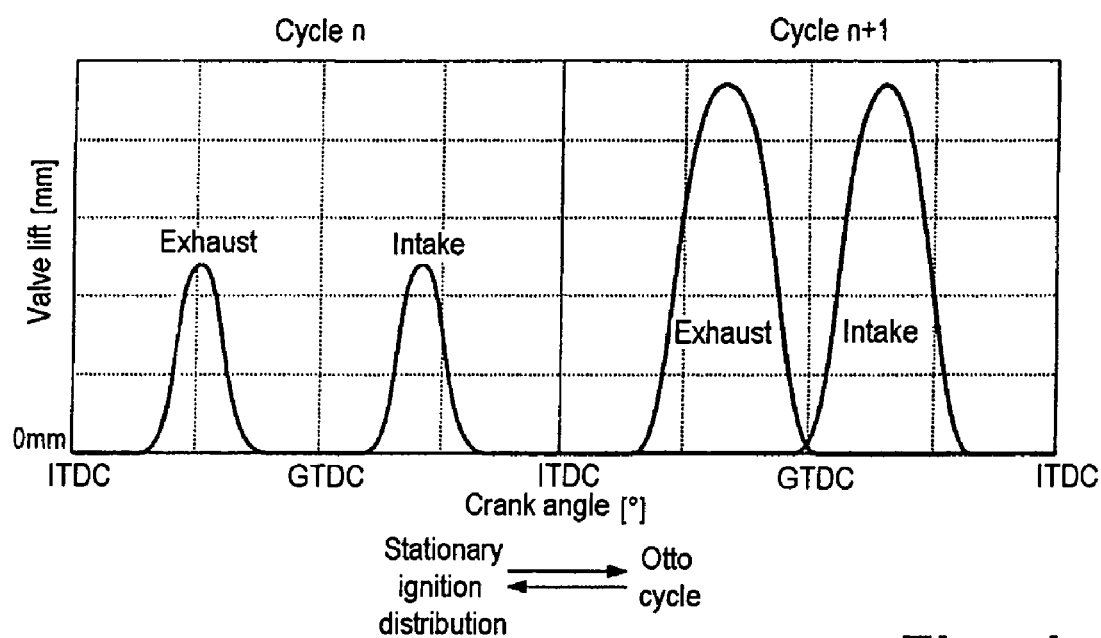
FIG. 4 shows a graph illustrating the valve lift curves for the event of a switch of both gas exchange valves during a change of the operating mode.

FIG. 4 shows a third configuration of the method according to the invention, in which the opening lift of both, the exhaust valve and of the intake valve, are altered during a change in the operating mode. In this case, for the event of a change to the compression ignition mode, the valve lifts of both valves are reduced. There is no need for a change in the phase position during switching of the operating mode, but, because of the immediate, extensive alteration the position of the throttle valve, has to be altered significantly quickly during the charge exchange phase, in order to ensure stoichiometric mix ratios in the external ignition mode.

What is claimed is:

1. A method for operating an internal combustion engine (1) having cylinders (2), each including a piston (3) delimiting a combustion chamber (4) to which fuel and fresh gas are supplied to form a combustible fuel mix, the fresh gas being supplied through intake ports (13) and combustion exhaust gases being discharged through exhaust ports (1), intake valves (6) and exhaust valves (7) disposed in the intake and, respectively, exhaust ports (13, 14) for controlling the cyclic charge exchange, and a valve operating mechanism (26) for operating the valves (6, 7) in an operating mode with external ignition, in which the fuel mix is ignited by a spark plug (8) and which is provided in part of the load range of the internal combustion engine, and an operating mode with compression ignition in which the control of the gas exchange valves (6, 7) is altered in such a manner that combustion exhaust gases are retained in the combustion chamber (4) and participate in the formation of the fresh mix for combustion during the following working cycle of the cylinder (2) in another part of the load range of the internal combustion engine, said method comprising the step of adjusting, the valve lift of at least one of the gas exchange valves (6, 7) during a change in the operating modes, controlling the gas exchange valves (6, 7) by means of a cam-type valve operating mechanism (26), including cams with different cam contours (27) using a switching element for switching the cams with different contours for changing the operating mode between the external ignition mode and the compression ignition mode, and, in addition to the switch-over between cams, by controlling the start of combustion in the compression ignition mode by changing the gas exchange phases via phase adjustment of the camshaft operating mechanism.

2. The method as claimed in claim 1, wherein the operating modes are changed by a switching element using a switchable cup tappet.

3. The method as claimed in claim 2, wherein the switching element used is a switching cam follower.

4. The method as claimed in claim 1, wherein the start of combustion is additionally controlled by a fuel injection strategy.

5. The method as claimed in claim 1, wherein during a change in the operating mode to the external ignition mode, the opening lift of at least one of the types of valves is increased.

6. The method as claimed in claim 1, wherein during a change in the operating mode the opening lift of only one of the valve types (6, 7) is altered.

7. The method as claimed in claim 6, wherein in the event of a change in the operating modes, the opening lift of one valve type (6, 7) is first changed and then the phase position ($\phi$) of the opening period of the other valve type is altered.

8. The method as claimed in claim 6, wherein the opening lift of the exhaust valve (7) is altered, and, in the event of a change in the operating modes to the external ignition mode, the phase position ($\phi$) of the opening period of the intake valve (6) is advanced.

9. The method as claimed in claim 6, wherein the opening lift of the intake valve (6) is altered, and, in the event of a change in the operating modes to the compression ignition mode, the phase position ($\phi$) of the closing of the exhaust valve (7) is retarded.

10. The method as claimed in claim 1, wherein, in the event of a change in the operating modes, the opening lift of both valve types (6, 7) is altered simultaneously.

11. The method as claimed in claim 1, wherein, in the event of a change in the operating modes, the air/fuel ratio in the combustion chamber (4) is adjusted by varying the setting of a throttle member (24) in the intake port (13) of the internal combustion engine (1).

* * * * *